United States Patent [19]

Boomgaard et al.

[11] Patent Number: 4,668,465

[45] Date of Patent: May 26, 1987

[54] METHOD AND APPARATUS FOR REMOTELY MONITORING A PROCESS CARRIED OUT IN A CONTAINMENT STRUCTURE

[75] Inventors: Dirk J. Boomgaard, Monroeville Boro; James D. Fetrow, York; Charles G. Geis, N. Huntingdon; Fred J. Mills, Penn Hills; James A. Neuner, Richland Township, Allegheny County, all of Pa.

[73] Assignee: Westinghouse Electric Corp., Pittsburgh, Pa.

[21] Appl. No.: 665,228

[22] Filed: Oct. 26, 1984

[51] Int. Cl.[4] ............................................. G21C 7/36
[52] U.S. Cl. ................................... 376/216; 376/215; 376/217; 376/258; 324/208; 340/870.07; 340/870.15
[58] Field of Search ............... 376/216, 215, 217, 258; 324/208; 340/870.07, 870.11, 870.15

[56] References Cited

U.S. PATENT DOCUMENTS

| | | | |
|---|---|---|---|
| 3,846,771 | 11/1974 | Young | 340/195 |
| 3,852,661 | 12/1974 | Szabo | 376/258 |
| 3,855,059 | 12/1974 | Groves | 376/258 |
| 3,858,191 | 12/1974 | Neuner | 340/188 R |
| 3,893,090 | 7/1975 | Neuner | 340/188 R |
| 4,125,432 | 11/1978 | Brooks | 376/258 |
| 4,170,754 | 10/1979 | Schmitz | 376/258 |
| 4,371,496 | 2/1983 | Lawson | 376/258 |
| 4,385,028 | 5/1983 | Salaman | 376/258 |

Primary Examiner—Donald P. Walsh
Attorney, Agent, or Firm—Daniel C. Abeles

[57] ABSTRACT

A rod position indicating system for a pressurized water reactor generates within containment redundant sets of digital detector signals and applies both sets to each of two communications buses each controlled by a separate bus controller/serial output device located inside of containment. A pair of redundant serial data links transmits the redundant data from each bus controller/serial output device through containment to a dedicated CRT display and the plant computer each of which generates rod position displays from redundant information selected from one of the data links. The data for each rod is selected individually from the redundant signals received on the one data link. Rod position is presented in bargraph form on a multi-page display which includes overall status information along with the detailed presentations.

20 Claims, 7 Drawing Figures

SYSTEM STATUS
------EQUIPMENT ROOM ELECTRONICS------

PROM MEMORY CHECK: 01 02 03 04
RAM MEMORY CHECK: 01 02 03 04 05 06 07 08 09 10 11 12 13 14
15 16 17 18 19 20 21 22 23 24 25 26 27 28
29 30 31 32

NUMBER OF MAIN LOOP TIMEOUTS 00000

------CONTAINMENT ELECTRONICS------

| SUB-SYSTEM | A CHANNEL | B CHANNEL |
|---|---|---|
| +15 VOLT POWER-A | OK | OK |
| +15 VOLT POWER-B | OK | OK |
| -15 VOLT POWER-A | OK | OK |
| -15 VOLT POWER-B | OK | OK |
| HIGH TEMPERATURE | OK | OK |
| RAM MEMORY CHECK | OK | OK |
| PROM MEMORY CHECK | OK | OK |

NUMBER OF MISSING DETECTOR CARDS: 00000

------COMMUNICATION SYSTEM------

THE QUICK BROWN FOX JUMPS OVER THE LAZY DOG   R5422   LINK CHECK
HEADER COUNT=00569  A COUNT=00565  B COUNT=00565   SYSTEM ALARM

METHOD AND APPARATUS FOR REMOTELY MONITORING A PROCESS CARRIED OUT IN A CONTAINMENT STRUCTURE

BACKGROUND OF THE INVENTION

1. Field of the Invention

This invention is directed to a method and apparatus for remotely monitoring with high reliability a process carried out in a hazardous environment within a containment structure. More particularly, it is directed to a method and apparatus for transmitting redundant signals from a large number of detectors through the containment structure with a minimum number of penetrations. It is particularly applicable to transmitting to the plant control room outside of the containment building reliable indications of control rod position in a nuclear reactor.

2. Prior Art

There are many installations wherein the hazardous conditions under which a process is carried out require that it be enclosed in a containment structure. Under such conditions, it is desirable to be able to remotely monitor and control the process and to be able to do so with a great deal of reliability to preclude having to shutdown for lack of sufficient control, and with a minimum of pentrations through the containment structure to reduce construction costs. The latter requirement becomes particularly important in installations in which a large amount of information must be transmitted through the containment structure.

Radiation and toxic chemicals are exemplary hazardous conditions which require confinement within a containment structure to protect those working with them. A nuclear reactor is an example of an installation in which hundreds of detectors and control signals of various kinds must be transmitted through the containment structure for monitoring, protection, and control functions directed from outside. Remotely monitoring the position of the control rods within the core of the nuclear reactor is a procedure which requires the transmission of a great deal of information through the containment structure.

In a typical pressurized water reactor, there are several scores of drive rods which each incrementally step several neutron absorbing rods connected by a spider into and out of the reactor core. The positions of the neutron absorbing rods within the reactor core are derived from the positions of the associated drive rods; each of which is equipped with a position detector. Early rod position detectors used the change in impedance of a coil or the change in coupling between primary and secondary coils effected by the end of the drive rod as it moved through the coil to generate an analog signal indicative of rod position. The susceptability of such analog systems to variations in temperature, rod magnetization, permeability of the rod, power supply voltages and frequency, and to interference from adjacent control rods and drive mechanisms, led to the development of digital position indicating systems such as that disclosed in U.S. Pat. No. 3,846,771. This system uses a number of discrete coils spaced along the linear path traced by the end of the rod. The change in impedance of each coil in sequence as the rod advances through successive coils is used to generate discrete output signals or one output signal with discrete levels. Discrete output signals are preferred over a single signal with discrete levels because they can be more easily transmitted to remote locations and reliably decoded. Their use, however, significantly multiplies the number of signals that must be transmitted.

Reliability is of critical importance in monitoring the position of control rods in the core of a nuclear reactor. It is well-known that reliability can be enhanced through redundancy. In the digital rod position indicating systems disclosed in U.S. Pat. Nos. 3,858,191 and 3,893,090, redundant sets of coils are interleaved along the path of each drive rod and the signals generated as the end of the rod passes through the coils in each set are separately transmitted through the containment building wall through separate channels to the outside where they are combined to provide an indication of rod position. All of the data generated by one set of coils in each detector is transmitted over one channel and that generated by the second set of coils in each detector is transmitted over another channel. If either channel is inoperative, the remaining channel provides the position indication for all of the rods with half the resolution of the combined indication. While such systems provide protection against a single component failure, they are highly susceptible to certain dual component failures. For instance, if one transmission channel should fail, the signals from one entire set of coils for each detector are not available. A subsequent failure in the other set of coils for any detector results in a loss of all reliable information regarding the position of the neutron absorbing rods connected to the associated drive rod.

It is a primary object of the present invention to provide the capability for remotely monitoring a process carried out in a hazardous environment within a containment structure with high reliability and with a large amount of digital information transmitted using a limited number of penetrations through the containment structure.

SUMMARY OF THE INVENTION

This and other objects are realized by generating within the containment structure a plurality of redundant sets of detector signals representative of the value of selected process parameters, storing all of these signals within the containment structure in each of a plurality of microprocessors, serially transmitting the plurality of sets of redundant detector signals stored in each microprocessor to the outside of the containment structure over a separate serial data link, and generating separately outside the containment structure, redundant representations of the value of each of the selected parameters, each from the redundant sets of signals transmitted over one of the data links. The data link from which the redundant sets of signals used to generate each redundant representation are taken is selectable. In addition, the signal used to generate the representation is selectable as to each parameter from among the redundant signals received over the selected data link.

The apparatus used to carry out the invention includes means within the containment structure for generating a plurality of redundant sets of detector signals. Interface means applies all of the redundant signals to each of a plurality of communication buses equal in number to the number of redundant sets of signals. A plurality of bus controller/serial output devices located in the containment structure are each connected to one of the communications buses, to control the interface means in applying the redundant sets of detector signals to the associated communications bus, to store these signals, and to serially output them over its own data link extending through the containment structure to the outside. Redundant receiver devices on the outside of the containment structure generate from the redundant sets of detector signals received from one of the data links, a representation of the value of the detector signal. Switching means permit selection of the data link from which each receiver receives its redundant sets of detector signals and permits individual selection as to each detector of which of the redundant signal is to be used in generating the representation of the value of that detector signal.

As applied to monitoring the position of the control rods in a nuclear reactor, the detector signals are generated as multi-digit digital signals from the signals generated by the discrete coils spaced along the travel path of the rod. The redundant signals can be generated simply by reproducing the coil signals, since these components have been proven to be very dependable. Alternatively, interleaved redundant sets of coils can be used to produce the redundant detector signals.

The essence of the invention is that all of the redundant signals are all transmitted over all of the redundant transmission channels with each of the receivers being able to select the individual channel from which it receives the redundant signals. With such an arrangement, failure of the same component in each of the detector to display channels is required to cause a loss of any of the transmitted information thus providing increased reliability over the earlier systems in which the redundant signals were transmitted separately over independent transmission channels.

BRIEF DESCRIPTION OF THE DRAWINGS

A full understanding of the invention can be gained from the following description when read in conjunction with the accompanying drawings in which:

FIG. 7 is a diagram illustrating another page of the exemplary display.

DESCRIPTION OF THE PREFERRED EMBODIMENTS

Figure 1:
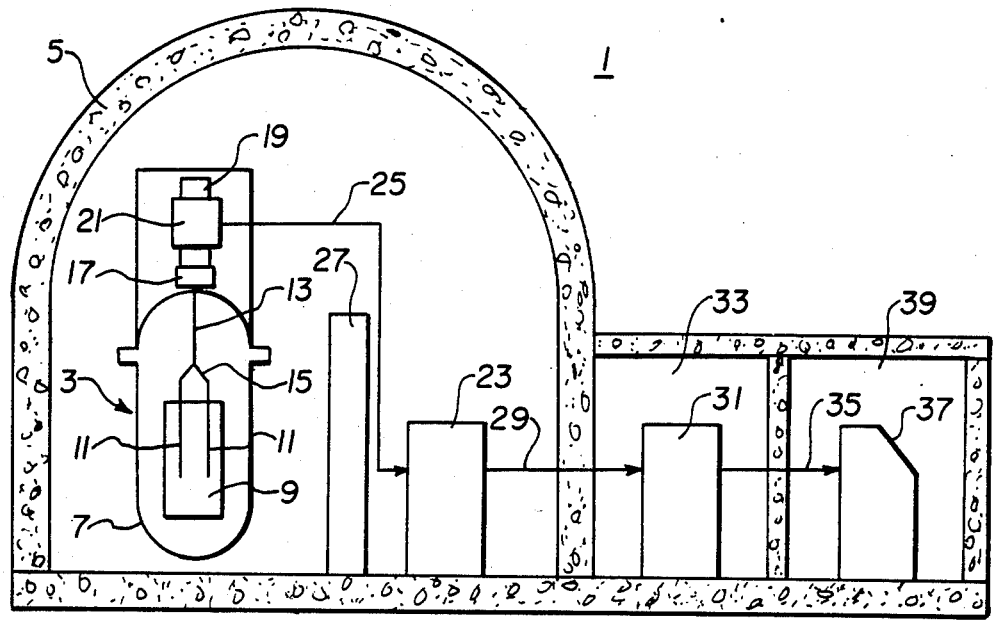
FIG. 1 is a vertical section through the containment building of a pressurized water reactor (PWR) showing schematically the relative positioning of components pertinent of the invention.

The invention will be described as applied to a rod position monitoring system for the pressurized water reactor (PWR) shown in FIG. 1 although it is to be understood that the invention has broader application to instrumentation generally for nuclear reactors, and even more broadly, to remote control and monitoring of other processes carried out in a hazardous environment inside a containment structure. The PWR 1 of FIG. 1 includes a nuclear reactor 3 enclosed within a containment building 5 which prevents the escape of most radiation generated by the reactor. The reactor 3 includes a reactor vessel 7 housing a core 9 of fissile material having hundreds of neutron absorbing rods 11 which control the reactivity of the core. These neutron absorbing rods 11 include: control rods which are moved in and out of the core to regulate the power level of the reactor, shutdown rods which are either all the way in when the reactor is shutdown or all the way out when it is at power, and part-length rods which can be used to regulate the axial distribution of power in the core 9. The neutron absorbing rods 11 are inserted in and retracted from the core by drive rods 13 with several neutron absorbing rods driven by a common drive rod 13 through a spider 15. The control rods and shutdown rods are further grouped into typically four banks each with the rods in each bank distributed symmetrically across the reactor core and with all of the rods in each bank driven in and out of the core in synchronism by their drive rods 13.

The drive rods 13 are incrementally stepped into and out of the core 9 by a drive rod mechanism 17 such as the magnetic jack device disclosed in U.S. Pat. No. 3,158,766. As the drive rods 13 are lifted up by their respective drive rod mechanisms 17 they each advance upward into a separate housing 19 on top of the reactor vessel 7. A rod position detector 21 tracks the movement of the end of the drive rod within the housing to determine the position within the reactor core 9 of the associated neutron absorbing rods 11. Since the reactor vessel 7 forms one of the several barriers to the release of fissile material and since the rod housings form an extension of that barrier, no penetrations of the housings are permitted to determine the position of the drive rods. It is for this reason that it has been common practice to use various arrangements of electrical coils in the detectors 21 as described above.

A separate detector 21 is provided for each drive rod 13 of which, as mentioned above, there are several scores in a typical PWR. The electrical signals generated by each detector 21 are sent to a data cabinet 23 over electrical leads 25. The data cabinet 23 is located within the containment building 5 but is separated from the reactor 3 by a "biological shield" 27 which reduces the radiation to which the electrical components within the cabinet 23 are exposed, thereby significantly extending their useful life. As will be more fully discussed below, these electrical components process the signals received from the detectors 21 and output them over serial data links 29 extending through the containment building wall to controller/interface equipment 31 in equipment room 33. The controller/interface equipment 31 processes the serial data received over the data links and sends the processed data over leads 35 to a display device and plant computer, identified collectively as 37, in the control room 39.

Figure 2:
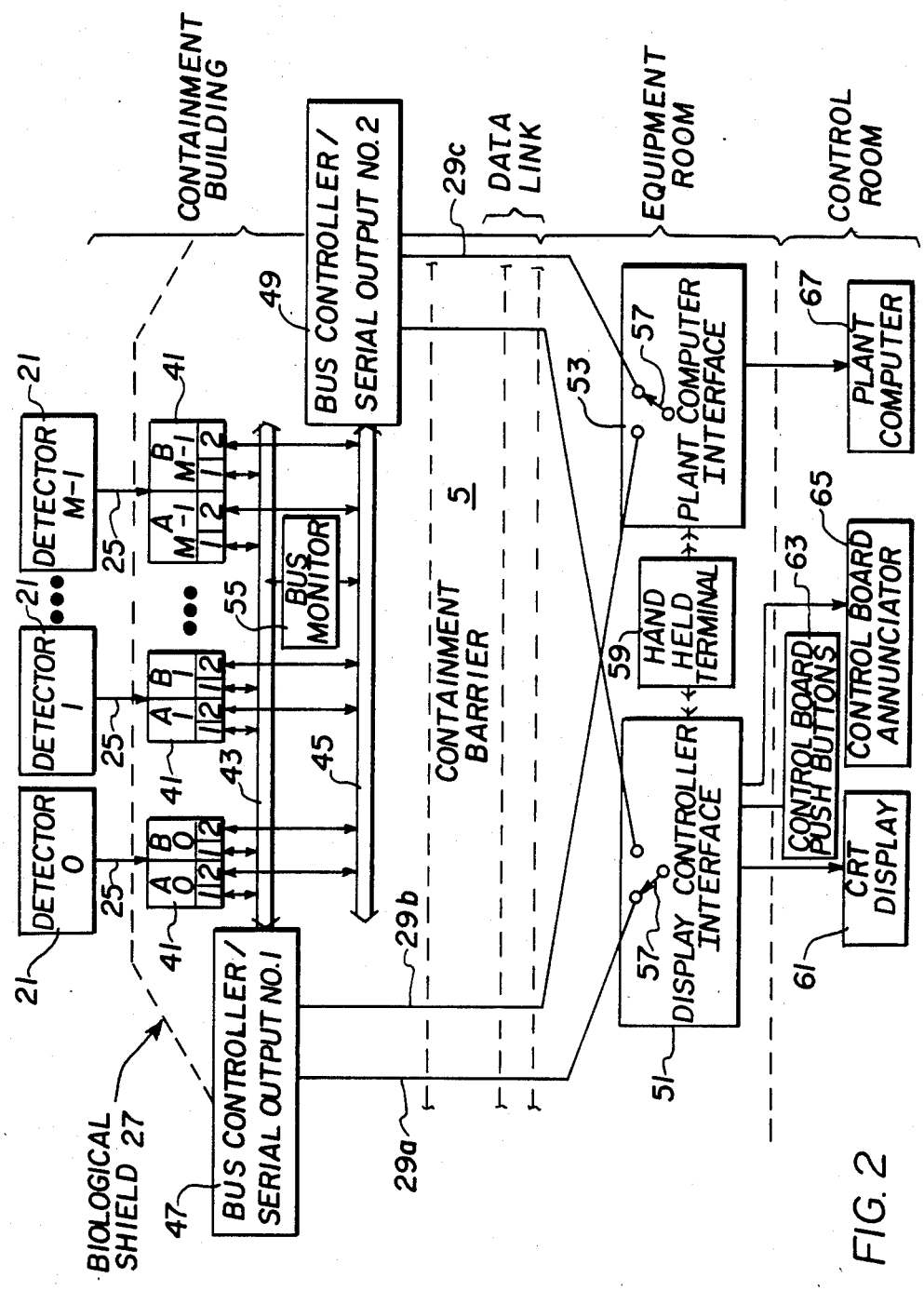
FIG. 2 is a schematic diagram illustrating a remote rod position monitoring system constructed in accordance with the teachings of the invention.

The overall architecture of the rod position indicating system is illustrated in FIG. 2. In the system shown, one level of redundancy is used except that only one detector 21 and one set of interconnecting leads 25 are provided for each drive rod. Field history has shown these components to be sufficiently reliable to be used without backup in most applications. However, as will be more evident from the more detailed discussion below, the system architecture is also applicable to systems using redundant detector coils.

The signals on leads 25 from each of the detectors 21 are applied to a separate encoder card 41 housed in the data cabinet 23 in the containment building. Each of the detector cards 41 has two identical circuits, labeled A and B in FIG. 2, which process the signals generated by the detector coils to produce redundant binary gray code representations of rod position. A key aspect of the invention is that the redundant information from the A and B circuits on the encoder cards 41 is distributed to each set of redundant components in the system. Thus, the encoder cards 41 include four separate fault isolating bus interfaces which feed the redundant binary rod position signals generated by the A and B circuits to each of two redundant, fully independent, byte parallel communications buses 43 and 45 physically provided on backplane cards in the data cabinet 23. Each of the communications buses 41 and 43 is controlled by a bus controller/serial output device 47 and 49 respectively mounted on its own printed circuit card in cabinet 23. Each bus controller/serial output card polls each redundant half of each encoder card 41 to collect and store all of the rod position data once per second. These devices also contain circuitry to monitor the local environment including temperature, power supply voltage, door "open" status, and self test.

Each of the bus controller/serial output cards 47 and 49 has two redundant individually buffered serial data link outputs 29a and b and 29c and d respectively. On one bus controller/serial output card, 47 for instance, one data link, 29a, is the primary link to a display controller/interface 51, which forms part of the equipment 31 located in the equipment room 33, and the second data link, 29b, serves as a backup input for a plant computer interface 53 also located in the equipment room. The other bus controller/serial output card, 49, has one data link, 29c, which is the primary link to the plant computer interface 53 and a second, 29d, which is a backup to the display controller/interface 51.

The data stored by the bus controller/serial output cards 47 and 49 is formatted into three blocks for transmission over each of the associated pairs of data links. The three blocks contain, respectively, all rod positions from the "A" portion of each of the encoder cards, all rod positions from the "B" portion of each of the encoder cards, and a fixed field and system status information. The data is transmitted using an asynchronous simplex byte count oriented protocol similar to DDCMP (digital data communications message protocol). The bus controller/serial output cards 47 and 49 each utilize a single chip microprocessor for control of all functions. As a result, the sequence of bus control and serial data link protocol can be easily modified for unique applications.

A single bus monitor card 55 is provided to improve self test and fault diagnosis. When polled by the bus controller/serial output cards, 47 and 49, it provides complementary fixed binary codes in place of rod position signals. Proper receipt of those codes verifies the integrity of each bus and assists in the isolation of system faults to the board level before maintenance personnel enter the containment building. Alternatively, separate bus monitor cards can be provided at the remote end of each bus 43 and 45 to assure continuity of the entire bus. The fixed field block of data transmitted by each bus controller/serial output device provides a means for checking and isolating faults in the data links 29.

The containment electronics in data cabinet 23 also includes fully redundant d-c power supplies that are individually distributed via the backplane and are diode auctioneered at the board level.

The display controller/interface 51 and the plant computer interface 53, which comprise the controller/interface equipment 31 located in the equipment room 33, each receive data from the two bus controller/serial output cards 47 and 49 over serial data links 29a and d and 29c and b respectively. Only one serial data link is used by either subsystem at any give time. The source of the data is chosen manually by a toggle switch 57. Each subsystem 51, 53 receives the serially transmitted data and checks for transmission errors. They also check system status failures and compare the rod position from the redundant portions of each encoder card 41 as a reasonability check.

Only one source, either "A" or "B", of data for each rod is used for control of display, alarm and plant computer interfaces. The selection of the set of redundant data to be used is made manually by a small hand-held portable terminal 59 which may be plugged as needed into the display controller/interface 51 or plant computer interface 53. The operator may choose that all rod position data be taken from the "A" side or the "B" side of each encoder card 41 or he may choose which side the data will be taken from on a rod by rod basis. Once the selection is made, the instructions are stored in nonvolatile memory so that the system will automatically return to the previous operating mode following a power outage. The ability to manually select the source of the data, both from the bus controller/serial output cards and from the encoder cards, as well as the overall system architecture, insures maximum fault tolerance and recoverability for those few equipment failures that may occur.

Each subsystem 51 and 53 processes its set of rod position data and controls it associated display devices. The display controller interface 51 formats the data for one of five display pages and produces an output compatible for driving a color cathode ray tube (CRT) monitor 61 in the main control board located in the control room 39. The operator interface is provided with four push buttons 63 also in the main control board to control system reset, alarm acknowledgement, rod position data page selection and system alarm page selection. The display controller interface 51 also provides two contact closure outputs to a control board annunciator system 65 for urgent and non-urgent alarms. The urgent alarm results from any of the many detectable system failures. Those system alarms are displayed on the CRT 61. The non-urgent alarms result from detectable misplacement of rods including rod deviation (rod to rod in a bank), rod on bottom, and rod off top. These alarms are also deisplayed on the CRT 61 as more fully described below.

The plant computer interface 53 generates outputs suitable for use by the plant computer 67 located in the control room for generating on its CRT, displays similar to those presented on the CRT color monitor 61 thus providing the redundant representation of the rod positions. The plant computer also logs the rod position signals for record keeping purposes.

Figure 3:
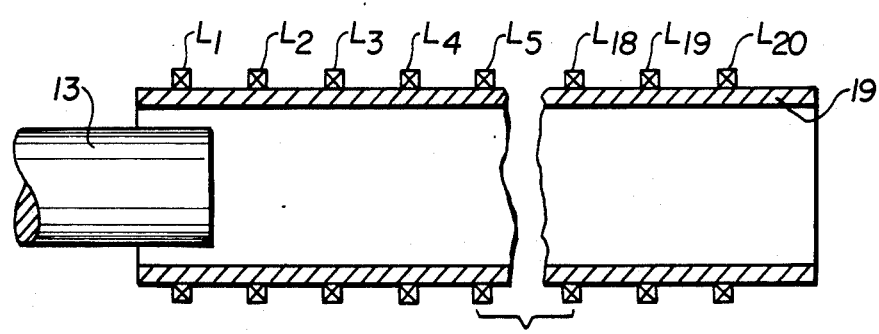
FIG. 3 is a longitudinal section through a portion of a drive rod assembly for the PWR of FIG. 1 showing the arrangement of the coils of a digital position detector suitable for use with the remote monitoring system illustrated in FIG. 2.
Figure 4:
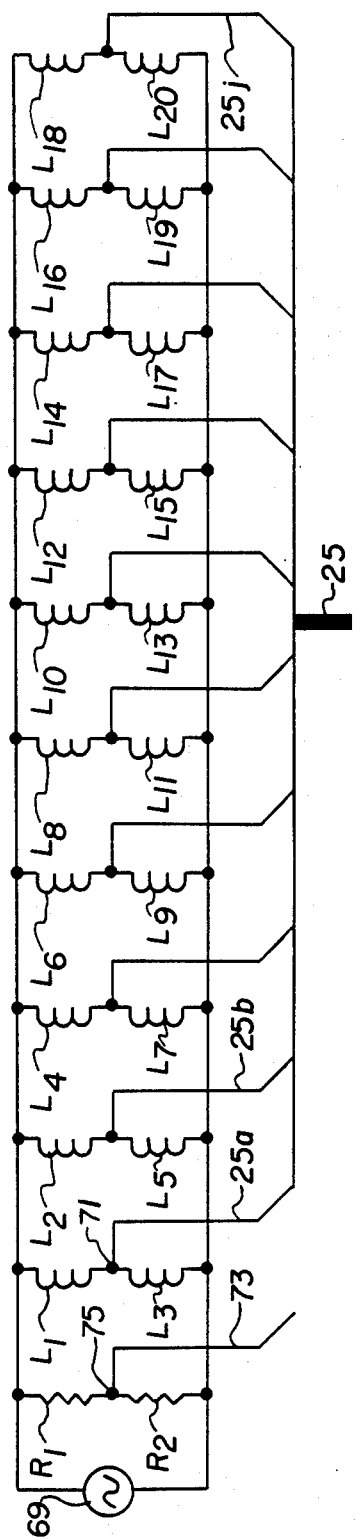
FIG. 4 is a schematic circuit diagram illustrating a circuit for the coils of the detector shown in FIG. 3 suitable for use in the system of FIG. 2.

FIGS. 3 and 4 illustrate a suitable rod position detector 21 for use with the invention. The detector depicted is the digital detector covered by commonly owned copending application Ser. No. 657,423 filed on Oct. 3, 1984. As illustrated, the drive rod 13 is longitudinally movable inside the tubular housing 19 and is preferably made of a material of high magnetic permeability such as steel, but could also be made of an electrically conductive material in which eddy currents can be induced by magnetic fields. Spaced along the travel path of the drive rod 13 at spaced intervals along the outside of the housing 19 are a number of electrical coils $L_1$ through $L_{20}$.

As shown in FIG. 4, each of the coils $L_1$ through $L_{20}$ is energized by a low voltage, low frequency, for instance 12 volt 60 hertz, a-c power source. The magnetic fields generated by such a low frequency current in the coils penetrate the non-magnetic housing 13 and, where it is present, the drive rod 13. Since the drive rod is electrically conductive and/or preferably magnetically permeable, the impedance of each coil in succession changes as the end of the drive rod passes through it. Thus, by monitoring the sequential changes in the impedance of the coils, the movement of the rod can be tracked.

Pairs of detector coils are connected in series across the a-c source 69 together with a pair of series connected resistors $R_1$ and $R_2$ which are located in the data cabinet 23. Leads 25a through 25j connect the common nodes 71 of each resistor pair with appropriate circuits on dedicated encoder card 41 in the data cabinet 23. Lead 73 connects the common node 75 between the resistors $R_1$ and $R_2$ with these same circuits which compare the voltage at node 75 with that at each of the nodes 71 of the coil pairs. With matched coils and resistors of equal value, no differential voltage is generated for coil pairs in which both coils or neither coil is penetrated by the rod 13, however, a differential voltage will be generated for those coil pairs in which one coil is penetrated by the rod 13 and one is not. As will be seen, the differential voltage between the node 74 and each node 71 generates one digit of a binary coded signal. By arranging the coils so that the end of the rod 13 penetrates a coil in a pair to the left and a pair to the right between passing through the two coils in a given pair, a unique multi-digit digital signal is generated by the detector.

Figure 5:
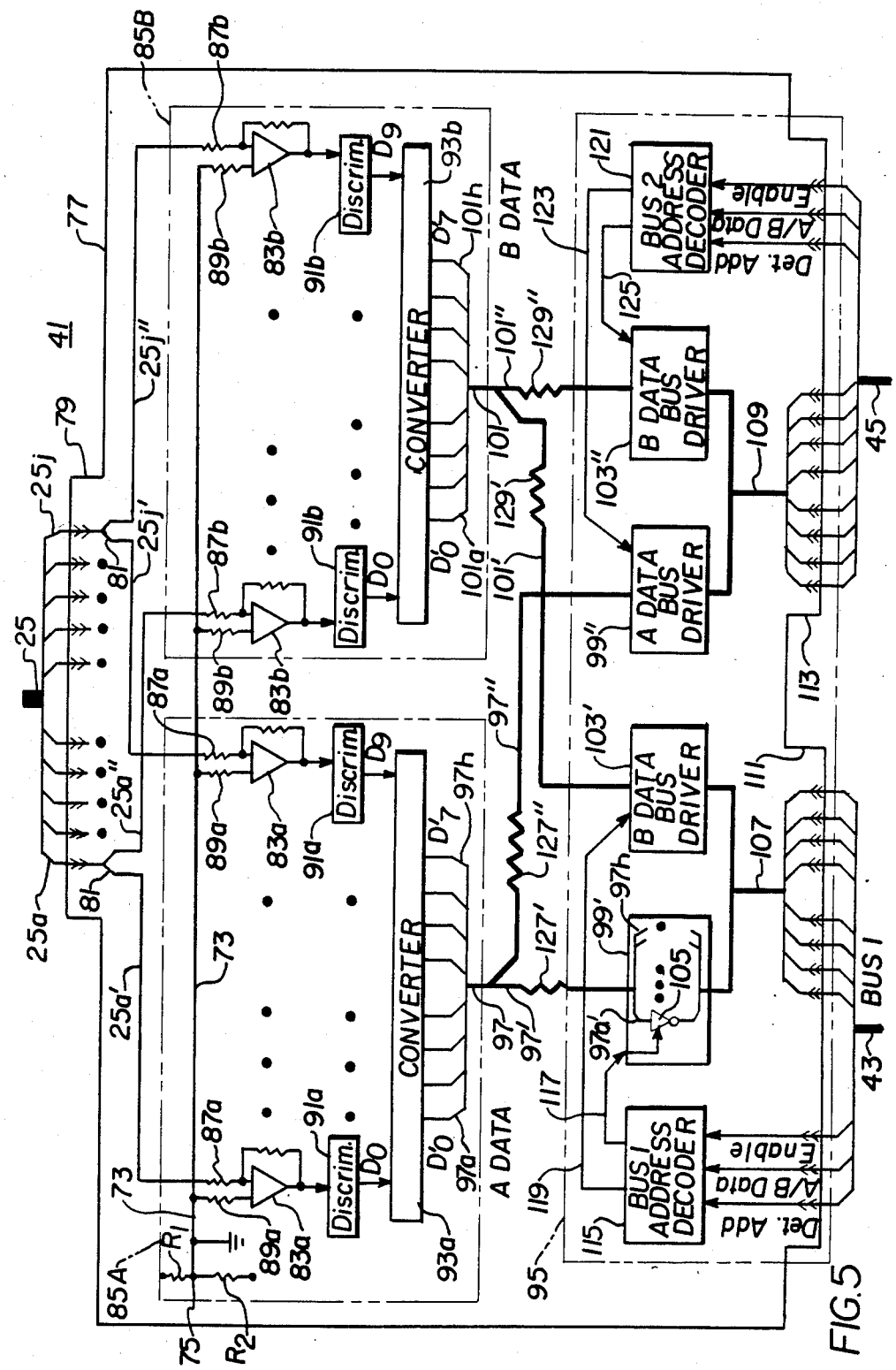
FIG. 5 is a schematic diagram of a circuit board which forms part of the system shown in FIG. 2 and which interfaces with the circuit diagram of FIG. 4.

FIG. 5 illustrates the circuit on one of the encoder boards 41 which processes the signals from one of the detectors 21. The lead 25a through j from the detector coils are applied to the input side of a printed circuit board 77 through connector 79. Each of the leads 25a through 25j is split at a branch point 81 into two leads 25a' and a" through 25j' and j" with each of the leads 25a' through 25j' applied to one input of a differential amplifier 83A in a processing circuit 85A through an input resistor 87A, and with each of the leads 25a" through 25j" applied through an input resistor 87B to one input of a differential amplifier 83B in processing circuit 85B. In the case where a redundant coils were used, the signals from one set would be applied to the differential amplifiers 83A and those from the other set to the amplifiers 85B. The lead 73 from the common node 75 between the resistors $R_1$ and $R_2$, which are physically located on the printed circuit board 77, is applied to the other input of each of the differential amplifiers 83A and B through resistors 87A and B respectively. The differential a-c voltages produced by the amplifiers 83A and B are applied to discriminators 91A and B respectively where they are converted to d-c signals and compared with threshold levels to generate standard logic outputs, $D_0$ through $D_9$. Since there are only 20 coils in each detector, the 10 digit binary signals produced by the discriminators 91A and B are converted to 8 bit signals, $D_0'$ through $D_7'$, inconverters 93A and B respectively to be compatible with the 8 bit structure of the downstream components even though 5 digits would be sufficient to identify the location of the rod with respect to the 20 coils.

The 8 bit binary signals $D_0'$ through $D_7'$ produced by the processing circuits 85A and B are each applied through an interface 95 to each of the communications buses, BUS No. 1, 43, and BUS No. 2, 45. The leads 97a through 97h carrying the 8 bit signal from the A processing circuit are split into two leads each 97a' through h' and 97a" through h" for application to an A Data Bus Driver 99' and 99" associated with the No. 1 and No. 2 Buses 43 and 45 respectively. Similarly, the 8 bit signal from the converter 93B in the B processing circuit is applied over leads 101a through h which split into 101a' through 101h' and 101" through h' to B Data Bus Drivers 103' and 103".

Each of the bus drivers 99', 99", 103' and 103" includes 8 CMOS gates 105 which selectively feed either the applied A or B data to each of the 8 bit buses 43 and 45 through leads 107 and 109 and connectors 111 and 113 respectively. A Bus 1 Address Decoder 115 receives a detector address signal DET ADD, and A/B DATA signal and an ENABLE signal from the BUS 1 through connector 111. These signals are generated by the bus controller/serial output No. 1, 47, to control the sequential transmission of data on communications Bus No. 1. The DET ADD signal identifies which board (i.e. which detector) is to place data on the bus, the A/B DATA signal determines which of the redundant sets of signals, A or B, is to be transmitted and the ENABLE signal implements the transfer. With the detector board shown in FIG. 5 addressed and A data selected, the ENABLE signal applies a pulse to each of the CMOS gates 105 in A Data Bus Driver 99' through lead 117 to apply the 8 bit digital position signal generated by processing circuit 85A to Bus No. 1. With the B data from this detector selected, an ENABLE signal applies a pulse through lead 119 to each of the CMOS gates (not shown) in B Data Bus Driver 103'. In like manner, the A data and B data are applied to BUS No. 2 by similar control signals generated by bus controller/serial output No. 2, 49, and applied to BUS 2 Address Decoder 121 which responds by pulsing the A Data Bus Driver 99" through lead 123 and the B Data Bus Driver 103" through lead 125 as commanded.

The input impedance of the differential amplifiers 83A and B and the value of the input resistors 87A and B and 89A and B is very high while the impedance of the coils $L_1$ to $L_{20}$ and resistors $R_1$ and $R_2$ is low so that a failure in one of the processing circuits 85A or B is not propagated to the other through the inputs. Likewise, the input impedance of the CMOS gates 105 in the bus drivers 99', 99", 103' and 103" is very high as is the value of resistors 127', 127", 129' and 129" while the output impedance of the converters 93A and B is relatively low so that no faults are propagated through the outputs. The serial transmission of data through the communications buses, and data links as well as the digital storage of data in the bus controller/serial outputs preserve the isolation of the redundant detector signals.

The primary function of the rod position indicating system is to provide plant operators with as much information as possible concerning the position of the rods in the reactor core. It was determined that this could best be done by preventing the information to the operator in the form of graphical displays on a color CRT rather than through individual analog or digital indicators. Redundant displays are made available by presenting the rod position information on the CRT of the plant computer 67 as well as the dedicated CRT 61 in the control room.

Figure 6:
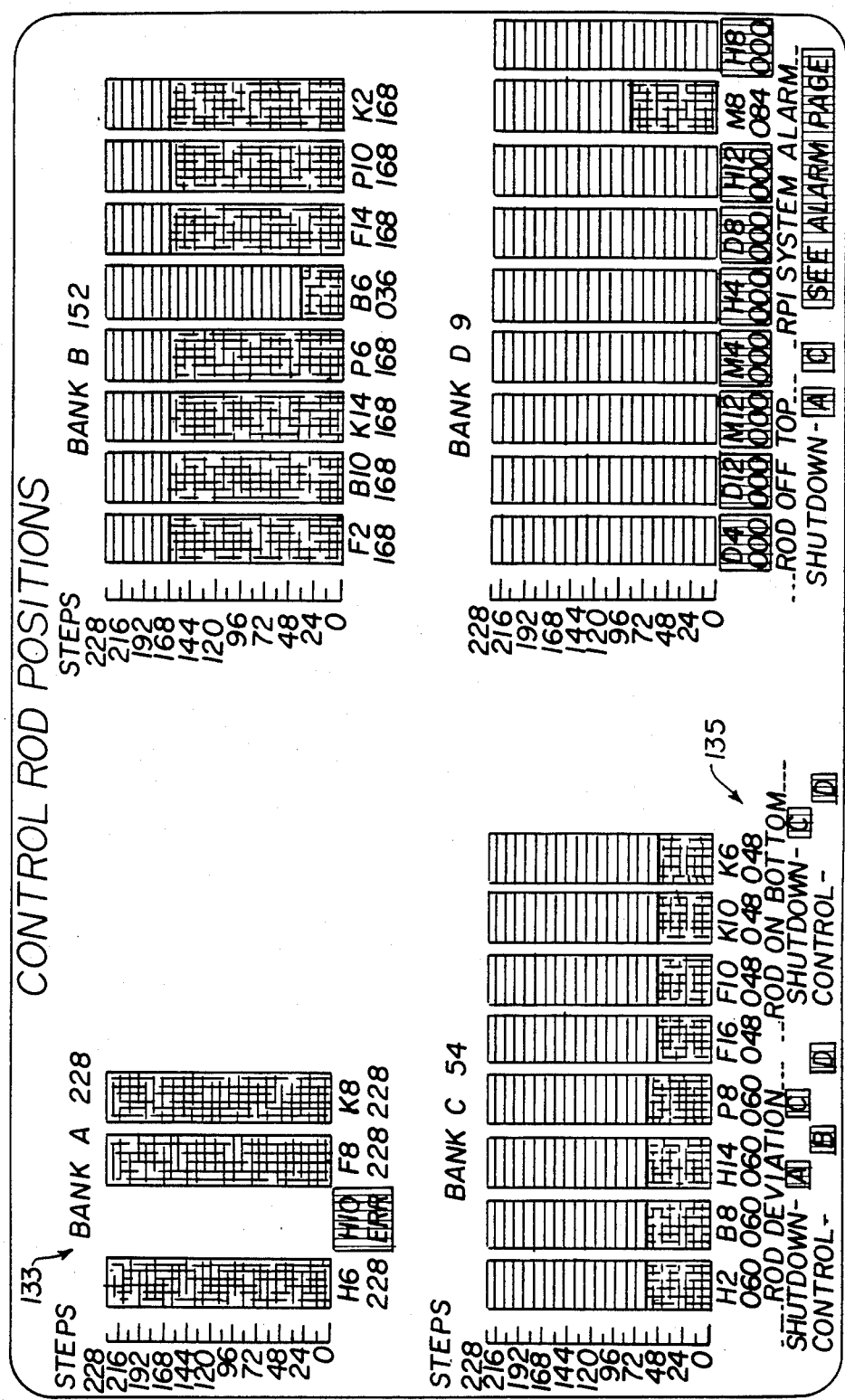
FIG. 6 is a diagram illustrating one page of an exemplary multipage display generated by the invention.

Since all the pertinent data cannot be reasonably presented on one CRT display, a five page display 131 was developed. Three pages illustrate respectively, the positions of the control rods, shutdown rods and the part-length rods (where necessary). FIG. 6 illustrates the control rod display page 131A. The major field of the CRT is devoted to a bargraph representation 133 of rod position, while space is reserved at the bottom of each page for status messages 135. This arrangement provides the operator with information pertinent to abnormal conditions on the other pages while viewing the position data on a particular page.

Rod position is displayed by bank. The customary convention of indicating rod position by the number of steps the rod has been withdrawn is utilized with a scale of 1 to 228 steps in 12 step increments shown. In keeping with this convention, the amount of withdrawal is shown on the bargraph in a prominent color such as yellow with the background shown in a less prominent color such as blue. The identification of the rod and the number of steps it is withdrawn is shown below the bar. Where no information or erroneous information is received, ERR appears in reverse video with a red background and no bar is shown as for the rod H10 in the A bank of control rods. The average value of the valid rod position signals is shown after the bank label, for instance "152" for the B bank.

Four groups of status messages 135 are provided at the bottom of the page. The first indicates Rod Deviation. All of the rods in a bank should move simultaneously. Any deviations from this pattern should be brought to the operator's attention. FIG. 6 shows in the status message area that there are deviations in control rod banks B and D. Reference then to the bargraphs shows that rod B6 is only out 36 steps while the remainder of the rods in B bank are out 168 steps. Likewise, the Bank D bargraphs show that rod M8 is out 84 steps while all the other D bank control rods are on the bottom. When such a status message first appears, the bank label flashes in reverse video. When the message is acknowledged, the background appears solid.

The second status message is identified as the "Rod on Bottom" signal. Normally, at power the control rods in all the banks will be out part way. The boron system is used to accommodate long term changes in load so that this condition prevails. Also, at power all the shutdown rods should be fully withdrawn. On the other hand, when the reactor is shutdown, all of the rods should be "on the bottom" or fully inserted. Thus, this message alerts the operator to an abnormal condition during operation and provides a quick reference during a reactor trip whether all the rods have been fully inserted. In FIG. 6, it can be seen that all of the rods in the D bank, except one which is out of place, are on the bottom indicating an abnormal condition in the control system which should be investigated.

The third status message is "Rod Off Top" which is only pertinent as to the shutdown rods and indicates in FIG. 6 that rods in the A and C shutdown banks are not fully withdrawn as they should be with the reactor at power. If the operator wants more detailed information, he can page to the shutdown rod page which is presented in the simpler format to FIG. 6 to see in more detail from the bargraphs what the situation is. The part-length rod page for plants having such rods is much similar since there is only one bank of such rods and normally they are fully withdrawn under present control schemes.

The fourth status message is the rod position indicating system alarm messages "RPI System Alarm". When the "See Alarm Page" message appears in reverse video, the operator should look to the remaining two pages which include the "System Status" page 131B of FIG. 7. This page shows thh status of system components by location. For the equipment room electronics, PROM and RAM memory check results are displayed. The valid check results are shown in blue while components which failed the test are shown in red. In the example shown, the number 2 PROM memory and number 6 RAM have failed their tests and are thus shown in red which also generates a "System Alarm" in the lower right-hand corner of this page and the "See Alarm Page" signal on the rod position pages. The "Number Of Main Loop Time-outs" count shown for the equipment room electronics is the number of times the dead man timer timed out since the last software reset. This number provides a measure of system integrity.

The "Containment Electronics" section indicates the status of components in the cabinet 23 located inside the containment building. The items displayed are self-explanatory. The "Communication System" section provides information on the status of the data link which is supplying data to the redundant display being viewed. "The quick brown fox jumped over the lazy dog" is an example of the fixed field header message which is transmitted as an integrity check. The "Header Count" indicates how many times this message has been received correctly and the A and B counts indicate the number of times the A and B data have been received without an error. A system alarm is generated if any of the three counts exceeds the average of the counts. A maintenance page can also be provided which displays the raw data received on each rod and can be referred to for more detailed information in case of a system alarm.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for transmitting signals generated by a plurality of detectors located in a hazardous environment enclosed within a containment structure to the outside of the containment structure, said apparatus comprising:
   means within the containment structure for generating a plurality of redundant sets of digital detector signals;
   a plurality of redundant communications buses located within the containment structure;

interface means within the containment structure for applying each set of the redundant digital detector signals to each of the redundant communications buses;

a plurality of bus controller/serial output devices in the containment structure, each of which is connected to one of said communications buses for controlling said interface means in applying said redundant sets of digital detector signals to the associated communications bus, and for serially outputting the redundant sets of digital detector signals received over the associated communications bus;

serial data link means connected to each of said bus controller/serial output devices within the containment structure and extending through the containment structure to the outside thereof; and receiver means outside of said containment structure connected to said serial data link means, for receiving said redundant sets of digital detector signals serially transmitted over said data link means and for generating therefrom representations of the value of the detector signals.

2. The apparatus of claim 1 wherein said receiver means includes a plurality of receiver devices and means for selectively connecting each of said receiver devices to one of said serial data link means to receive the redundant sets of digital detector signals from one of said communications buses through the associated bus controller/serial output device.

3. The apparatus of claim 2 wherein said receiver devices include means for selecting for each detector signal, one of said redundant digital detector signals and means for generating for each detector said representation of the value of the detector signal from selected redundant digital detector signal.

4. Apparatus for remotely monitoring the operation of a nuclear reactor enclosed in a containment structure, said apparatus comprising:

a plurality of detector means associated with the reactor within the containment structure each generating first and second redundant digital detector signals representative of a selected operating parameter of the reactor;

first and second communications buses located within the containment structure;

interface means within the containment structure for applying each of said first and second digital detector signals to each of said communications buses;

first and second bus controller/serial output devices each connected within said containment structure to one of said communications buses, for controlling said interface means in applying said redundant digital detector signals to the associated communications bus, and for serially outputting the redundant detector signals received on the associated communications bus;

first and second data link means each connected in the containment structure to one of said bus controller/serial output devices and extending through the containment structure to the outside thereof; and first and second receiver means connected to the first and second data link means for generating from the redundant digital detector signals representations of the value of the detector signals.

5. The apparatus of claim 4 wherein said receiver means each include means for selectively receiving the redundant digital detector signals from one of said first and second data link means.

6. The apparatus of claim 5 wherein said receiver means each include means for selecting for each detector signal one of said first and second redundant digital detector signals received through said one data link means.

7. The apparatus of claim 4 for use in monitoring the position of the drive rods which position neutron absorbing rods in the core of the reactor with each detector monitoring the position of one drive rod and wherein said detector means each include: a plurality of sensor located along the travel path of the associated drive rod with each sensor generating a sensor signal representative of the position of the drive rod relative to the sensor, and processing means for generating a multi-digit detector signal from said plurality of sensor signals.

8. The apparatus of claim 7 wherein said processing means includes means for reproducing the multi-digital signal to generate said first and second redundant digital detector signals.

9. The apparatus of claim 7 wherein the detector means includes first and second sets of interleaved sensors, first processing means for generating said first multi-digit digital detector signal from signals generated by the first set of sensors and second processing means for generating said second multi-digit digital detector signal from signals generated by the second set of sensors.

10. A nuclear power plant comprising:

a containment structure;

a reactor core located inside the containment structure and having a plurality of drive rods for positioning neutron absorbing rods within the reactor core to control the reactivity thereof;

a plurality of detector means each of which is located within the containment structure and generates redundant first and second multi-digit digital detector signals representative of the position of one of said drive rods;

first and second communications buses located within said containment structure;

interface means within said containment structure for applying each of said first and second digital detector signals to each of said first and second communications buses;

first and second bus controller/serial output devices connected to the first and second communications buses respectively for controlling the interface means to apply sequentially all of said first and then all of said second digital detector signals to the associated communications bus and for serially outputting the first and second digital detector signals received over the associated communication bus;

first and second data links connected respectively within the containment structure to each of the first and second bus controller/serial output devices and extending through the containment structure to the outside thereof; and first and second receiver means outside of the containment structure each selectively connected to the first data link from one bus controller/serial output device and the second data link from the other bus controller/serial output device for generating representations of the position of said drive rods from the first and second digital detector signals received over the selected data link.

11. The apparatus of claim 10 wherein each detector means includes a plurality of electrical coils positioned along the travel path of the associated drive rod for generating a plurality of electrical signals indicative of the position of the drive rod, processing means for generating said first and second multi-digit detector signals from said electrical signals, said processing means being spaced from the reactor core and said electrical coils, and electrical leads for transmitting said electrical signals from the coils to the processing means.

12. The apparatus of claim 11 in combination with a radiation barrier inside said containment structure between said reactor core and electrical coils on one side of the barrier and said processing means, communications buses, interface means, bus controller/serial output devices and data link means all on the other side of the barrier.

13. The apparatus of claim 12 wherein each receiver means includes means for selectively generating said representations of the rod positions from the first and second multi-digit digital detector signals received through only one of said data links.

14. The apparatus of claim 13 wherein each receiver means includes means for selectively, as to the position of each drive rod, generating said representation of position from one only of said first and second digital detector signals received through said one data link means.

15. The apparatus of claim 14 wherein one of said receiver means is a display device which generates a visual display of rod position from the multi-digit digital rod position signals and the second receiver means is a plant computer for monitoring operation of the nuclear power plant and includes means for generating representations of rod position from said multi-digit digital detector signals.

16. A method of transmitting reliable signals representative of the value of a plurality of selected parameters in a process carried out in a high radiation environment inside of a containment structure to the outside of said structure with a minimum number of penetrations through the structure, comprising the steps of:

generating inside of the containment structure a plurality of redundant sets of signals representative of the measurement of each selected parameter;

storing inside the containment structure in each of a plurality of microprocessors equal in number to the number of redundant sets, said plurality of redundant sets of signals;

serially transmitting said plurality of redundant sets of stored signals from each microprocessor inside said containment structure to the outside of said containment structure over its own serial data link passing through said containment structure; and generating separately outside of said containment structure, each from the redundant sets of signals transmitted over one of said serial data links, redundant representations of the value of each of said selected parameters.

17. The method of claim 16 wherein the step of generating redundant representations includes as to each representation the step of selecting from among the data links, the one from which said plurality of sets of signals is to be taken.

18. The method of claim 17 wherein the step of generating redundant representations includes as to each representation, selecting separately as to each parameter the signal to be used for generating the representation of that parameter from among the plurality of redundant signals transmitted over said one data link.

19. The method of claim 18 wherein said selected parameters are each of the position of a drive rod which positions control rods within the core of a nuclear reactor located within the containment structure and wherein the step of generating a plurality of sets of redundant signals comprises generating first and second sets of redundant multi-digit digital signals each representative of the position of the associated drive rod.

20. The method of claim 19 wherein the step of generating a representations of rod position comprises: generating a multipage visual display with a plurality of said pages each including analog visual representations of the position of selected groups of rods generated from said multi-digit digital signals with each of said plurality of pages displaying different rod groups, and with each of said plurality of pages also displaying digital representations of selected status conditions of all of said groups of rods.

* * * * *